United States Patent [19]
Moriyama

[11] Patent Number: 4,644,417
[45] Date of Patent: Feb. 17, 1987

[54] DIGITAL SIGNAL REPRODUCING APPARATUS

[75] Inventor: Masaru Moriyama, Yamato, Japan

[73] Assignee: Victor Company of Japan, Ltd., Kanagawa, Japan

[21] Appl. No.: 710,863

[22] Filed: Mar. 12, 1985

[30] Foreign Application Priority Data

Mar. 16, 1984 [JP] Japan ................................. 59-50558

[51] Int. Cl.⁴ ...................... G11B 20/20; G06K 5/04
[52] U.S. Cl. .......................................... 360/26; 371/1
[58] Field of Search .............................. 360/26; 371/1

[56] References Cited

U.S. PATENT DOCUMENTS 3,702,996 11/1972 Wolfer et al. ........................... 360/26
3,911,493 10/1975 Kihara et al. .......................... 360/33

OTHER PUBLICATIONS

"A Review of the MCA Disco-Vision System", by Kent D. Broadbent, Jul. 1974, Journal of the SMPTE, vol. 83.
Illustrated Dictionary of Electronics, 2nd edition, published 1982 by TAB Books, Pa., USA.

Primary Examiner—Vincent P. Canney
Attorney, Agent, or Firm—Ladas & Parry

[57] ABSTRACT

A digital signal reproducing apparatus comprises reproducing elements for reproducing digital signals from tracks of a magnetic tape having a guard band separating each of two adjacent tracks, which reproducing elements are arranged equidistant from each other along the tape width direction over a range which includes all of the tracks and guard bands, a parallel-to-serial converter supplied in parallel with outputs of the reproducing elements for performing a serial-to-parallel conversion and for producing a serial reproduced signal, a controller supplied with the serial reproduced signal for detecting a reproduced signal of a first track and for producing a pulse corresponding to the first track during a time period in which the outputs of those reproducing elements corresponding to a substantially uniform part of a magnetic field intensity distribution of the first track are obtained, which controller time-sequentially produces pulses corresponding to each of the tracks with a period corresponding to the track pitch, and an output circuit responsive to the output pulses of the controller for obtaining reproduced signals of the tracks and independently producing the reproduced signals of the tracks.

6 Claims, 18 Drawing Figures

DIGITAL SIGNAL REPRODUCING APPARATUS

BACKGROUND OF THE INVENTION

The present invention generally relates to digital signal reproducing apparatuses, and more particularly to a digital signal reproducing apparatus which can satisfactorily reproduce digital signals recorded on a plurality of parallel tracks on a magnetic tape even when a relative positional difference exists in the track width direction between reproducing elements and a corresponding track.

Generally, when converting stereo audio signals into a digital signal and recording the digital signal on a magnetic tape by use of a stationary magnetic head, the total transmission rate in two channels is over 2 Mbits/sec when it is assumed that the audio signal converted into the digital signal by sampling the audio signal at a sampling frequency of over 44.1 kHz with 16 bits per channel. Hence, in order to stably record and reproduce such a digital signal, it is necessary to reduce the transmission rate per track by increasing the number of tracks. For example, in case where a compact type cassette tape is used as the magnetic reverse directions, the track width of each of the tracks is selected to 65 $\mu$m and the width of a guard band between two adjacent tracks is selected to 15 $\mu$m.

The magnetic tape of the compact type cassette tape must be moved at a constant speed without deviations in the tape width direction, in order to reproduce signals from the plurality of pre-recorded tracks having the extremely small track width in the order of 65 $\mu$m. Thus, a reproducing apparatus which is designed to play this type of magnetic tape is generally provided with high-precision tape guides on both sides of recording and reproducing heads, and one edge of the magnetic tape is guided along flanges of the tape guides so that the magnetic tape makes contact with the recording and reproducing heads at predetermined positions. The tape guides compensates for the deviation of the magnetic tape in the tape width direction for each cassette tape. On the other hand, a dual capstan mechanism employing a pair of capstans is provided on the reproducing apparatus to control the tape moving speed, the tape tension and the state of contact between the head and the magnetic tape to become constant. However, the established standard for the tape width of the magnetic tape of the compact type cassette is in a range of 3.81 mm−50 $\mu$m to 3.81 mm+0. For this reason, the provision of the tape guides is insufficient to enable movement of the magnetic tape so that reproducing elements of the reproducing head accurately scan over corresponding tracks on the magnetic tape, which tracks have the extremely small track width in the order of 65 $\mu$m.

Accordingly, in the conventional reproducing apparatus, one of the plurality of tracks on the magnetic tape is used as a control track, and a pair of control heads are arranged side-by-side in the track width direction of the control track. In this case, the tracking error is detected from a difference in outputs of the pair of control heads. The position of the head is displaced under control responsive to the detected tracking error so that the reproducing elements of the reproducing head accurately scan over the corresponding tracks on the magnetic tape.

There is another conventional reproducing apparatus provided with a light sensor at positions corresponding to the edges of the magnetic tape. According to this other conventional reproducing apparatus, variations in the lights reflected from the magnetic tape are detected, and the tape guides are displaced under control repsonsive to the detected light variations so as to compensate for the deviation of the magnetic tape in the tape width direction.

However, the conventional reproducing apparatuses described heretofore require tracking control means for displacing the reproducing head or the magnetic tape so that the reproducing elements of the reproducing head accurately scan over the corresponding tracks on the magnetic tape. When such tracking control means is provided on the reproducing apparatus, it becomes necessary to provide a detector, an actuator and the like exclusively for the tracking control, and there are disadvantages in that the reproducing apparatus becomes bulky and the expensive. Further, there is a disadvantage in that the tracking control cannot be carried out with respect to a resonance of the rotating system, mechanical resonance and the like, because the mechanical response of the actuator is too slow to enable the head to accurately follow the deviation of the magnetic tape in the tape width direction introduced by causes such as the resonance of the rotating system and the mechanical resonance.

SUMMARY OF THE INVENTION

Accordingly, it is a general object of the present invention to provide a novel and useful digital signal reproducing apparatus in which the disadvantages described heretofore are overcome.

Another and more specific object of the present invention is to provide a ditigal signal reproducing apparatus in which a plurality of reproducing elements for reproducing from a magnetic tape digital signals which are magnetically recorded on a plurality of tracks of the magnetic tape, where each of two adjacent tracks among the plurality of tracks are separated by a guard band, are arranged over a range including all of the plurality of tracks and all of the guard bands. The reproducing elements are arranged equidistant from each other, and output signals of those reproducing elements among the plurality of reproducing elements opposing a corresponding track are effectively obtained to produce a reproduced signal of the corresponding track. According to the digital signal reproducing apparatus of the present invention, it is possible to constantly and satisfactorily reproduce the digital signals from the tracks on the magnetic tape even when the moving magnetic tape deviates in the track width direction with respect to the reproducing elements. In addition, it is unnecessary to provide means for mechanically displacing the reproducing elements or the magnetic tape for carrying out the tracking control.

Still another object of the present invention is to provide a digital signal reproducing apparatus comprising a converter supplied with all of the outputs of the reproducing elements arranged in the manner described before for producing a serial reproduced signal by subjecting the outputs of the reproducing elements to a parallel-to-serial conversion, a controller for detecting from the serial reproduced signal the signal reproduced from a first track so as to produce a pulse which is in correspondence with the first track. during a time period in which outputs are obtained from those reproducing elements opposing an approximate center part of the first track excluding both side end parts thereof, and for time-sequentially producing thereafter pulses which are in correspondence with the remaining tracks with a period equal to the track pitch of the plurality of tracks, and an output circuit supplied with the pulses which are in corresponding with the plurality of tracks for obtaining from the serial reproduced signal the signals reproduced from each of the plurality of tracks and for independently producing the reproduced signals. According to the digital signal reproducing apparatus of the present invention, it is unnecessary to once obtain the reproduced signal of each of the plurality of tracks, and hence, the circuit construction is simple.

Other objects and further features of the present invention will be apparent from the following detailed description when read in conjunction with the accompanying drawings.

BRIEF DESCRIPTION OF THE DRAWINGS

FIGS. 5(A) through 5(M) show waveforms of signals at parts of the block system shown in FIG. 4.

DETAILED DESCRIPTION

Figure 1:
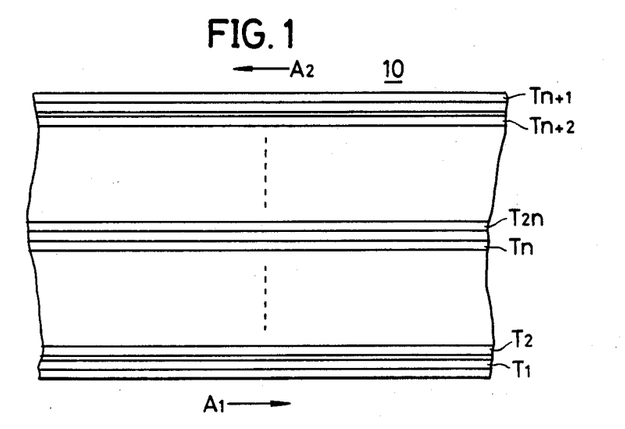
FIG. 1 shows an example of a track pattern formed on a magnetic tape recorded with digital signals which are to be reproduced on the digital signal reproducing apparatus according to the present invention.

An example of a track pattern formed on a magnetic tape recorded with digital signals which are to be reproduced on the digital signal reproducing apparatus according to the present invention, is shown in FIG. 1. Tracks $T_1$ through $T_{2n}$ extend in a longitudinal direction of a magnetic tape 10, and digital signals are recorded on the tracks $T_1$ through $T_{2n}$, where n is a natural number and is equal to 20, for example. The tracks $T_1$ through $T_n$ are formed while the magnetic tape 10 moves in an arrow direction $A_1$, and the tracks $T_{n+1}$ through $T_{2n}$ are formed while the magnetic tape 10 moves in an arrow direction $A_2$. Digital signals of audio signals which are converted into parallel signals, are simultaneously recorded on the n tracks ($T_1$ through $T_n$ or $T_{n+1}$ through $T_{2n}$) by n recording heads. A recording system for carrying out such a simultaneous recording of the n tracks is known, and a description thereof will be omitted in the present specification since the recording system is not closely related to the subject matter of the present invention.

Each of the tracks $T_1$ through $T_{2n}$ has a track width of 65 μm, for example, and a track pitch (that is, the interval of the tracks) of 80 μm, for example. In other words, the adjacent tracks are separated by a guard band having a width of 15 μm, for example, which guard band is not recorded with a signal. The magnetic flux distribution is approximately uniform at the central part of each track in the track width direction, but decreases at both edges of each track. The magnetic flux at the edges of each track leaks to the guard bands adjacent thereto.

Figure 2:
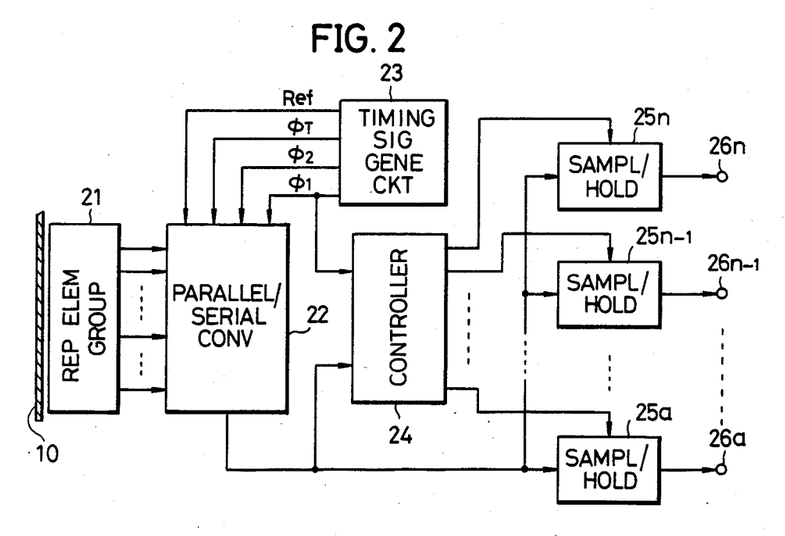
FIG. 2 is a general system block diagram showing an embodiment of the digital signal reproducing apparatus according to the present invention.

A general system block diagram of an embodiment of the digital signal reproducing apparatus according to the present invention is shown in FIG. 2. As will be described later on in the specification, a reproducing element group 21 comprises z reproducing elements arranged equidistant from each other in a line along the tape width direction over a range including all of n tracks $T_1$ through $T_n$ (or $T_{n+1}$ through $T_{2n}$) and all of guard bands separating the adjacent tracks on the magnetic tape 10, where z is greater than n. Output reproduced signals of the z reproducing elements of the reproducing element group 21 are supplied to a parallel-to-serial (parallel/serial) converter 22. For example, in a case where n=20 and 40 tracks are provided on the magnetic tape 10, the parallel/serial converter 22 is constituted by a 20 stage charge transfer device comprising charge transfer elements, such as a 80-stage bucket brigade device (BBD) which operates with two clock signals having mutually different phases. In addition to the reproduced signals, the parallel/serial converter 22 is supplied with a reference signal Ref, a transfer signal $\phi_T$ and clock signals $\phi_1$ and $\phi_2$ which are generated by a timing signal generating circuit 23.

For example, the parallel/serial converter 22 is supplied with the reference signal Ref for every predetermined period, and the reference signal Ref is successively transferred to each stage of the parallel/serial converter 22 responsive to the clock signals $\phi_1$ and $\phi_2$. The level of the reference signal Ref is greater than the maximum level of the reproduced signal. After the transferred reference signal Ref is produced from the parallel/serial converter 22, the transfer signal $\phi_T$ is supplied to the parallel/serial converter 22 from the timing signal generating circuit 23, and the reproduced signals from the reproducing elements of the reproducing element group 21 are transferred simultaneously to each stage of the parallel/serial converter 22. The reproduced signals stored in each of the stages of the parallel/serial converter 22, are successively transferred to respective subsequent stages of the parallel/serial converter 22 responsive to the clock signals $\phi_1$ and $\phi_2$. Thus, the parallel/serial converter 22 successively produces the reference signal Ref and the reproduced signals from the tracks $T_1$ through $T_n$ (or $T_{n+1}$ through $T_{2n}$). A serial reproduced signal produced from the parallel/serial converter 22 is supplied to a controller 24 and to n sample and hold circuits 25a through 25n, where the number n of the sample and hold circuits 25a through 25n is equal to the number of tracks from which the digital signals are reproduced, which number n is equal to 20, for example.

The controller 24 is supplied with the clock signal $\phi_1$ in addition to the serial reproduced signal. The controller 24 detects the reference signal Ref from the serial reproduced signal, and produces a pulse after the reproduced signal of the track $T_1$ (or $T_{n+1}$) is detected during a certain time period in which the reproduced signals corresponding to the uniform part of the magnetic field intensity distribution of the track $T_1$ (or $T_{n+1}$) are obtained. For example, the pulse produced from the controller 24 assumes a high level during this certain time period, and is supplied to the sample and hold circuit 25a. The track pitch of the tracks of the magnetic tape 10 is constant. Thus, after producing the pulse described above, the controller 24 produces pulses with a period corresponding to the track pitch, and these pulses are successively supplied to the respective sample and hold circuits 25b through 25n. The controller 24 stores a time from the detection of the reference signal Ref and the production of the first pulse, which time is indicative of the value for compensating for the deviation of the magnetic tape 10 in the tape width direction. When the reproduced signal level of the track $T_1$ is low and cannot be detected the next time the reproduced signal of the track $T_1$ is obtained, the controller 24 produces the first pulse after the stored time from the detection of the reference signal Ref. The controller 24 thereafter produces the pulses corresponding to the tracks $T_2$ through $T_n$ (or $T_{n+2}$ through $T_{2n}$) time-sequentially, with the period corresponding to the track pitch.

Among the sample and hold circuits 25a through 25n which constitute an output circuit, the sample and hold circuit 25a samples and holds the serial reproduced signal from the parallel/serial converter 22 when supplied with the output pulse of the controller 24. As a result, the reproduced signals obtained from a plurality of reproducing elements confronting the uniform part of the magnetic field intensity distribution of the track $T_1$ (or $T_{n+1}$) are sampled and held in the sample and hold circuit 25a and is obtained through a terminal 26a. Similarly, each of the sample and hold circuits 25b through 25n samples and holds the serial reproduced signal when supplied with the output pulse of the controller 24. A signal obtained by sampling and holding the reproduced signals from a plurality of reproducing elements corresponding to the uniform part of the magnetic field intensity distribution of one of the tracks $T_2$ through $T_n$ (or $T_{n+2}$ through $T_{2n}$) is obtained through a corresponding terminal among the terminals 26b through 26n. In other words, the reproduced signal of the track $T_1$ (or $T_{n+1}$) is obtained through the terminal 26a, and the reproduced signal of the track $T_n$ (or $T_{2n}$) is obtained through the terminal 26n.

Figures 3A, 3B:
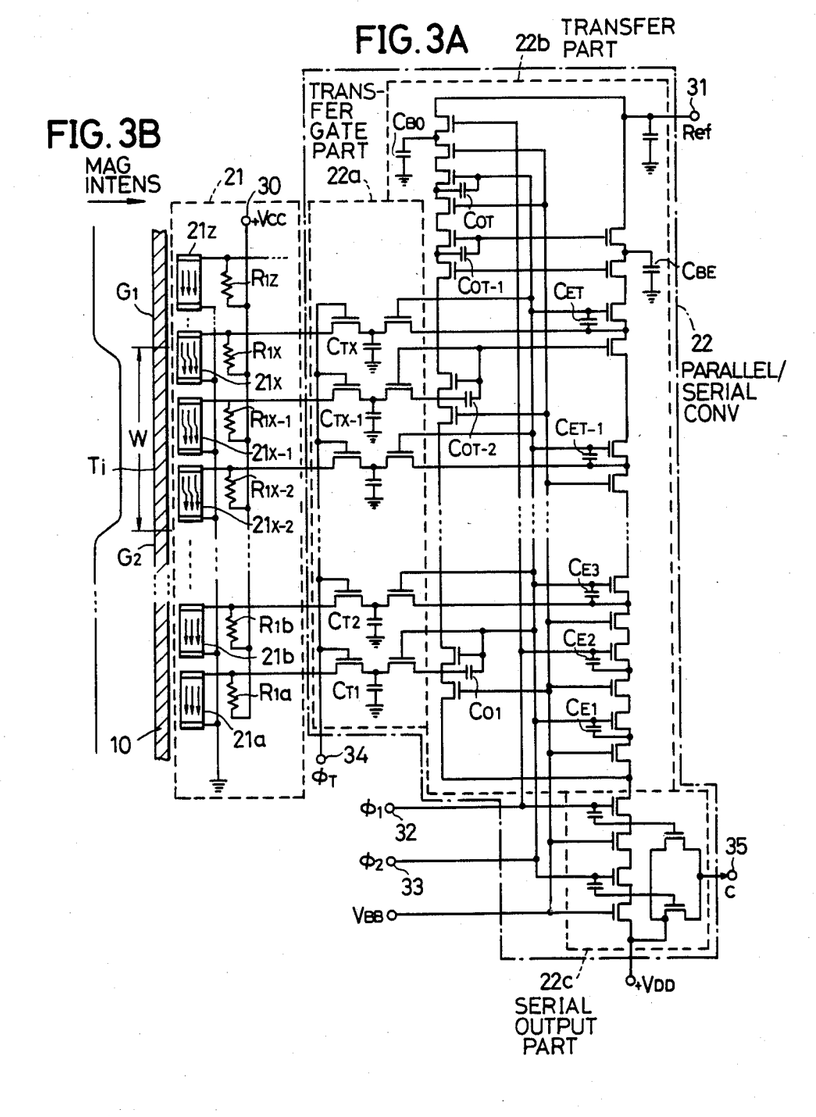
FIG. 3A is a system circuit diagram showing an embodiment of an essential part of the block system shown in FIG. 2.
FIG. 3B shows the magnetic field intensity distribution in the track width direction of one track on the magnetic tape in correspondence with reproducing elements shown in FIG. 3A.

Next, description will be given with respect to an embodiment of a concrete circuit of the reproducing element group 21 and the parallel/serial converter 22, by referring to FIG. 3A. In FIG. 3A, the magnetic tape 10 having the track pattern shown in FIG. 1 is illustrated in a cross section along the width direction thereof, and a part of the magnetic tape 10 including an arbitrary track $T_i$ and the guard bands on both sides of the arbitrary track $T_i$ is shown in an enlarged scale, where i is an arbitrary natural number from 1 to n. In FIG. 3A, the magnetic tape 10 moves vertically toward or away from the paper. The magnetic field intensity distribution in the track width direction is shown in FIG. 3B. The magnetic field intensity in a part of the arbitrary track $T_i$ indicated by a width W in FIG. 3B is uniform, but gradually decreases on both sides of the width W. The magnetic field intensity is equal to zero in guard band parts indicated by $G_1$ and $G_2$ in FIG. 3B. FIG. 3B shows the magnetic field intensity distribution for a case where the signal recorded in the cross sectional part of the arbitrary track $T_i$ represents a signal level "1". The magnetic tape 10 is formed with the tracks $T_1$ through $T_n$ (or $T_{n+1}$ through $T_{2n}$).

Magneto-resist elements (hereinafter simply referred to as MR elements) 21a through 21z which are used as the reproducing elements constituting the reproducing element group 21, are arranged equidistant from each other in a line along the tape width direction, over a range including all of the tracks $T_1$ through $T_n$ (or $T_{n+1}$ through $T_{2n}$) and all of the guard bands of the magnetic tape 10. One end of each of the MR elements 21a through 21z are coupled to a terminal 30 of a power source voltage $+Vcc$, through a corresponding resistor among resistors $R_{1a}$ through $R_{1z}$ having the same resistance. The other end of each of the MR elements 21a through 21z is commonly grounded. The one end of each of the MR elements 21a through 21z is coupled to field effect transistors (FETs) in each stage of a transfer gate part 22a of the parallel/serial converter 22.

Among the MR elements 21a through 21z of the reproducing element group 21, the MR elements $21x-2$ through 21x, for example, correspond to the arbitrary track $T_i$ of the magnetic tape 10 and are affected by the magnetic field of the arbitrary track $T_i$. Hence, the current paths within the MR elements $21x-2$ through 21x curve, for example, and the resistances thereof increase. As a result, the reproduced signal voltages from these MR elements $21x-2$ through 21x become large. On the other hand, the MR elements 21a and 21b, for example, which correspond to the guard band part of the magnetic tape 10, are unaffected by the magnetic field of the arbitrary track $T_i$. Accordingly, the current paths within these MR elements 21a and 21b are approximately linear and the resistances thereof are small. Consequently, the reproduced signal voltages from these MR elements 21a and 21b are small.

The parallel/serial converter 22 comprises a MOS BBD which operates with two clock signals having mutually different phases, and is constituted by the transfer gate part 22a, a transfer part 22b and a serial output part 22c. The output reference signal Ref of the timing signal generating circuit 23 is supplied to the transfer part 22b through a terminal 31. The clock pulses $\phi_1$ and $\phi_2$ having mutually inverted phases, are applied to respective terminals 32 and 33 and are supplied to the transfer part 22b and the serial output part 22c. The transfer signal $\phi_T$ is applied to a terminal 34 and is supplied to the transfer gate part 22a. The reference signal Ref which is applied to the terminal 31 with the predetermined period, is stored in capacitors $C_{BO}$ and $C_{BE}$ during the high-level period of the clock signal $\phi_1$. The reference signal Ref stored in the capacitors $C_{BO}$ and $C_{BE}$ is thereafter transferred to capacitors $C_{OT}$, $C_{OT-1}, \ldots, C_{O1}$ in the odd column and to capacitors $C_{ET}, C_{ET-1}, \ldots, C_{E1}$ in the even column responsive to the clock signals $\phi_1$ and $\phi_2$, and is obtained through an output terminal 35 of the serial output part 22c. After the reference signal Ref is produced from the serial output part 22c, the transfer signal $\phi_T$ assumes a high level when the clock signal $\phi_2$ assumes a high level. The reproduced signals from the MR elements 21a through 21z of the reproducing element group 21 are transferred to respective capacitors $C_{T1}$ through $C_{Tz}$ (only the capacitors $C_{T1}$ through $C_{Tx}$ are shown in FIG. 3A), and the reproduced signals from the capacitors $C_{T1}$ through $C_{Tz}$ are transferred to the respective capacitors $C_{O1}$ through $C_{OT-2}$ in the odd column and to the respective capacitors $C_{E1}$ through $C_{ET}$ in the even column of the transfer part 22b. The reproduced signals stored in the capacitors of the transfer part 22b are thereafter transferred successively within the transfer part 22b responsive to the clock signals $\phi_1$ and $\phi_2$. The reproduced signals are successively produced through the output terminal 35 of the serial output part 22c in a sequence of the reproduced signal from the MR element 21a, the reproduced signal from the MR element 21b, ..., the reproduced signal from the MR element $21x-1$, and the reproduced signal from the MR element 21x.

Figure 5:
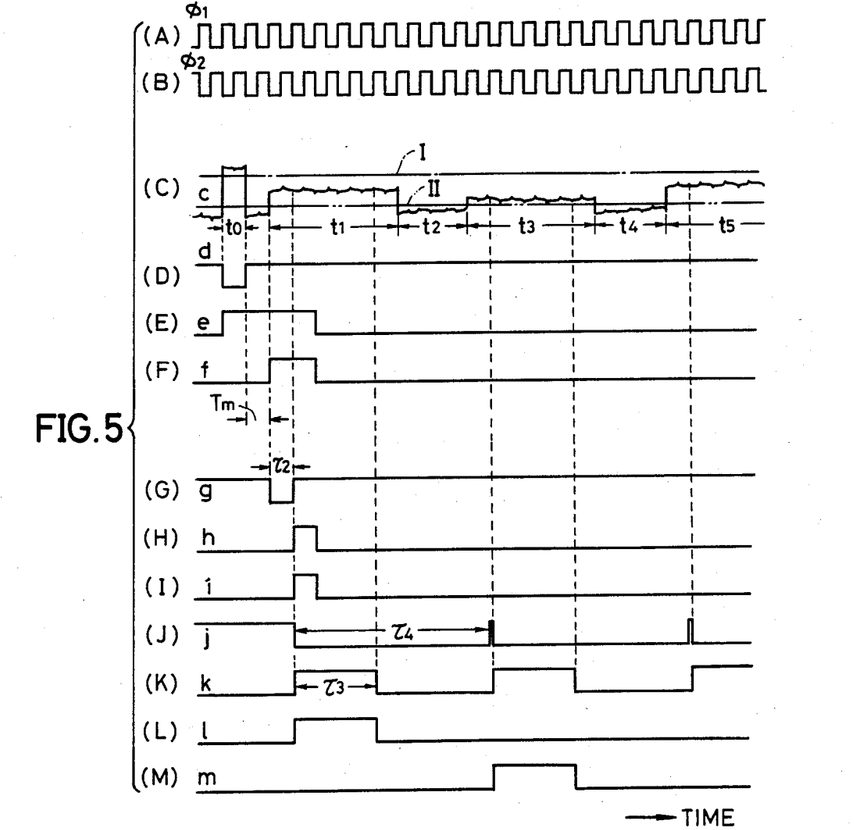

When it is assumed that the clock signals $\phi_1$ and $\phi_2$ have the waveforms shown in FIGS.5(A) and 5(B), respectively, a serial reproduced signal c shown in FIG. 5(C) is produced through the output terminal 35 of the parallel/serial converter 22. The reference signal Ref exists within a time period $t_0$ of the serial reproduced signal c. The reproduced signals from the MR elements corresponding to the track $T_1$ (or $T_{n+1}$) exist within a time period $t_1$ of the serial reproduced signal c. Similarly, the reproduced signals from the MR elements corresponding to the track $T_2$ (or $T_{n+2}$) exist within a time period $t_3$ or the serial reproduced signal c, and the reproduced signals from the MR elements corresponding to the track $T_3$ (or $T_{n+3}$) exist within a time period $t_5$ of the serial reproduced signal c. The reproduced signals from the MR elements corresponding to the guard bands exist within time periods $t_2$ and $t_4$ of the serial reproduced signal c.

Figure 4:
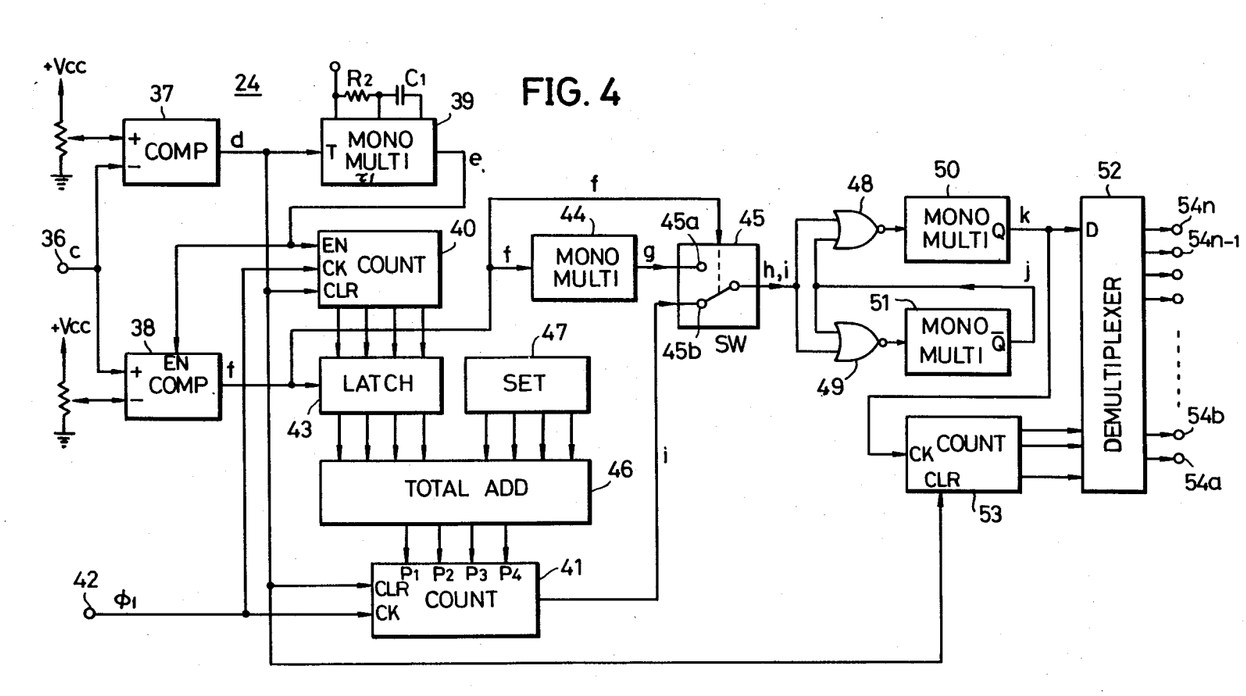
FIG. 4 is a concrete system block diagram showing an embodiment of a controller within the block system shown in FIG. 2.

A system block diagram of an embodiment of the controller 24 is shown in FIG. 4. The serial reproduced signal c shown in FIG. 5(C) which is produced through the output terminal 35 of the parallel/serial converter 22, is applied to a terminal 36. The serial reproduced signal c is supplied to comparators 37 and 38. The comparator 37 is supplied with a first reference level indicated by a one-dot chain line I in FIG. 5(C), from the power source (+Vcc) by way of a variable resistor. The comparator 37 produces a signal d shown in FIG. 5(D) which assumes a low level when the reference signal Ref within the serial reproduced signal c is detected. The signal d is applied to a trigger terminal T of a monostable multivibrator 39 and to respective clear terminals CLR of counters 40, 41 and 53. The monostable multivibrator 39 produces a pulse signal e shown in FIG. 5(E) which rises responsive to the fall in the signal d and assumes a high level for a delay time $\tau_1$ which is determined by a time constant obtained by a resistor $R_2$ and a capacitor $C_1$. The pulse signal e is applied to respective enable terminals EN of the counter 40 and the comparator 38.

The clock signal $\phi_1$ from the timing signal generating circuit 23 is applied to a terminal 42, and the clock signal $\phi_1$ is applied to respective clock terminals CK of the counters 40 and 41. The counter 40 counts the clock signal $\phi_1$ for the duration of the pulse signal e which assumes the high level for a predetermined time from the fall in the reference signal Ref. In other words, the counter 40 is reset during the low-level period of the signal d, and counts the clock signals $\phi_1$ which is received after the rise in the signal d. The counted value of the counter 40 is supplied to a latch circuit 43.

On the other hand, the comparator 38 is supplied with a second reference level indicated by a two-dot chain line II in FIG. 5(C), from the power source (+Vcc) by way of a variable resistor. The comparator 38 produces a signal f shown in FIG. 5(F) which assumes a high level when a reproduced signal having a level higher than the level of the reproduced signal of the guard band within the serial reproduced signal c is detected during the high-level period of the pulse signal e. The signal f is supplied to the latch circuit 43, a monostable multivibrator 44 and a switch 45. The monostable multivibrator 44 produces a pulse signal g shown in FIG. 5(G) which falls responsive to the rise in the signal f and assumes a low level for a delay time $\tau_2$ from the rise in the signal f. The pulse signal g is applied to a terminal 45a of the switch 45. A movable contact of the switch 45 is connected to the terminal 45a during the high-level period of the signal f which is applied to a control input terminal of the switch 45. The switch 45 produces a signal h shown in FIG. 5(H). The movable contact of the switch 45 is connected to a terminal 45b during the low-level period of the signal f.

The latch circuit 43 latches a counted value $T_m$ of the counter 40 when applied with the signal f, and supplies the latched counted value $T_m$ to a total adder 46. A fixed value $\tau_2$ corresponding to the time constant $\tau_2$ of the monostable multivibrator 44, is supplied to the total adder 46 from a setting circuit 47. The total adder 46 adds the value $\tau$hd 2 to the counted value $T_m$ from the latch circuit 43, and supplies an added signal to the counter 41. The counter 41 is a programmable counter. The counter 41 counts the clock signal $\phi_1$ from the input terminal 42 after receipt of the signal d, and generates a carry signal i shown in FIG. 5(I) when the counted value becomes equal to the added signal (indicative of the value $T_m + \tau_2$) from the total adder 46. The output carry signal i of the counter 41 is applied to the terminal 45b of the switch 45.

When the reproduced signal level of the track $T_1$ (or $T_{n+1}$) is large, the signal f which is the detection signal of the track $T_1$ (or $T_{n+1}$) is delayed by the delay time $\tau_2$, and the signal h shown in FIG. 5(H) which rises at the point when the magnetic field intensity distribution of the track $T_1$ (or $T_{n+1}$) becomes uniform is produced from the switch 45. At the same time, a time ($=T_m + \tau_2$) it takes for the signal h to rise from the rise in the signal d, is set inthe counter 41. The counted value $T_m$ of the counter 40 latched by the latch circuit 43, varies depending on the deviation of the magnetic tape 10 in the tape width direction, and is used to compensate for the tracking error in the track width direction.

Accordingly, in a case where the reproduced signal level of the track $T_1$ (or $T_{n+1}$) is small and the signal f is not generated, the movable contact of the switch 45 is connected to the terminal 45b. Hence, the carry signal i from the counter 41 having the same timing as the previously obtained signal h is produced from the switch 45, which counter 41 is set with the value $T_m + \tau_2$ upon previous detection of the track $T_1$ (or $T_{n+1}$).

The signal h or i from the switch 45 is applied to one input terminal of a NOR circuit 48 and to one input terminal of a NOR circuit 49. An output of the NOR circuit 48 is supplied to a monostable multivibrator 50 to trigger the same. Similarly, an output of the NOR circuit 49 is supplied to a monostable multivibrator 51 to trigger the same. A $\overline{Q}$-output of the monostable multivibrator 51 is supplied to the other input terminal of the NOR circuit 48 and to the other input terminal of the NOR circuit 49. The monostable multivibrator 50 has a delay time $\tau_3$ corresponding to the central part of the reproduced signal of each track within the serial reproduced signal c, where $\tau_3 < t_1 = t_3 = t_5$. The monostable multivibrator 51 has a delay time $\tau_4$ corresponding to one track pitch of the serial reproduced signal c, where $\tau_4 = t_1 + t_2 = t_3 + t_4$. The NOR circuits 48 and 49 each produce a signal which falls responsive to the rise in the signal h or i, and the monostable multivibrators 50 and 51 are triggered responsive to the fall in the respective outputs of the NOR circuits 48 and 49. Hence, a pulse signal j shown in FIG. 5(J) and having a period $\tau_4$ is obtained from the $\overline{Q}$-output terminal of the monostable multivibrator 51. Thus, a pulse signal k shown in FIG. 5(K) having a period $\tau_4$ and a pulse width $\tau_3$, is obtained from the Q-putput terminal of the monostable multivibrator 50. The pulse signal k is supplied to a demultiplexer 52 and to the counter 53.

After the counter 53 is reset by the signal d, the counter 53 counts the rises in the pulse signal k and supplies the counted value to the demultiplexer 52 as an address signal. When the address signal indicates "1", the demultiplexer 52 produces the pulse signal k from the monostable multivibrator 50 through a terminal 54a. When the address signal indicates "2", the demultiplexer 52 produces the pulse signal k from the monostable multivibrator 50 through a terminal 54b. Similarly thereafter, the demultiplexer 52 produces the pulse signal k from the monostable multivibrator 50 through a terminal 54n when the address signal indicated "n". Accordingly, pulse signals l and m shown in FIGS.5(L) and 5(M) are produced through the terminals 54a and 54b, respectively. The pulse signals produced through the terminals 54a through 54n of the controller 24 are independently supplied to the sample and hold circuits 25a through 25n shown in FIG. 2 and control the respective timings of the sample and hold.

As described heretofore, the reproduced signals from those MR elements corresponding to the approximate center part of each track, are selected electronically and sampled and held, and are produced through the terminals 26a through 26n corresponding to the tracks.

According to the digital signal reproducing apparatus of the present invention, there is no need to carry out a tracking control operation as in the conventional reproducing apparatus by detecting the tracking error and compensating for the detected tracking error by displacing the head or the magnetic tape. Conventionally, a high-precision tape guide or tracking control mechanism is used so as to minimize the delay from the time when the tracking error is detected and the time when the head or the magnetic tape is displaced to compensate for the detected tracking error. However, it is unnecessary to use such a high-precision tape guide or tracking control mechanism in the digital signal reproducing apparatus according to the present invention. In addition, since the present invention does not require mechanical aids to satisfactorily reproduce the digital signals from the tracks on the magnetic tape, the entire circuit shown in FIG. 2 can be manufactured in the form of an integrated circuit. Moreover, the MR elements 21a through 21z and the like can be formed with a high precision by methods such as vapor deposition and sputtering, and the resolution at the time of the reproduction in the track width direction can be improved. As a result, it is possible to reduce both the overall size and manufacturing cost of the digital signal reproducing apparatus. It is also possible to reduce the wiring by subjecting the reproduced signals from the MR elements 21a through 21z to the parallel/serial conversion in the parallel/serial converter 22 and serially transmitting the reproduced signals.

It is possible to use elements other than the MR elements for the reproducing elements of the reproducing element group 21. For example, Si Hall elements, MOS Hall elements and magnetic transistors may be used for the reproducing elements of the reproducing element group 21. It is possible to use counters requiring no resistors and capacitors for setting the time constants thereof, instead of the monostable multivibrators 44, 50 and 51. It is also possible to apply to the terminal 42 a clock signal having a repetition frequency greater than the repetition frequency of the clock signal $\phi_1$. For example, when the MOS Hall elements are used instead of the MR elements and the monostable multivibrators are replaced by the counters, the entire circuit shown in FIG. 2 can be manufactured in the form of a signal MOS integrated circuit. Further, it is possible to use charge transfer elements other than the BBD, such as a charge coupled device (CCD). Each of the counters 40 and 41 may be constituted by a time measuring circuit comprising a constant current source, a capacitor and a comparator.

The serial reproduced signal from the parallel/serial converter 22 may be supplied to an analog-to-digital converter. In this case, the pulse signal k from the monostable multivibrator 50 within the controller 24 is supplied to the analog-to-digital converter, so as to convert the serial reproduced signal into a digital signal responsive to the rise in the pulse signal k. The output digital signal of the analog-to-digital converter is once stored in a memory or the like, so as to digitally separate the digital reproduced signals of the tracks and produce a parallel output.

Further, the present invention is not limited to these embodiments, but various variations and modifications may be made without departing from the scope of the present invention.

What is claimed is:

1. A digital signal reproducing apparatus comprising:
    reproducing element means for reproducing from a magnetic tape digital signals which are magnetically recorded on n tracks of the magnetic tape, where n is a natural number greater than one, said magnetic tape having a guard band separating each of the two adjacent tracks among the n tracks, said reproducing element means comprising z reproducing elements arranged equidistant from each other along the tape width direction over a range which includes said n tracks and the guard bands on both sides of each of the z tracks, where z is a natural number greater than n;
    parallel-to-serial converter means supplied in parallel with outputs of each of said reproducing elements of said reproducing element means for subjecting the outputs of each of said reproducing elements to a parallel to serial conversion and for producing a serial reproduced signal so that the outputs reproduced by a pair of the reproducing elements which are distant from each other by the track pitch are outputted from the converter means at a predetermined time interval;
    controller means supplied with the serial reproduced signal from said parallel-to-serial converter means for detecting a signal reproduced from a first track out of signals reproduced from said n tracks and for producing one sampling pulse which is in correspondence with the first track during a time period in which the outputs of those reproducing elements confronting a part of the first track where a magnetic field intensity distribution is substantially uniform are obtained, said part excluding both sides of the first track, said controller means time-sequentially producing sampling pulses, inclusive of said one sampling pulse, every said predetermined time interval; and
    output circuit means responsive to the sampling pulses, inclusive of said one sampling pulse, for obtaining from said serial reproduced signal the only outputs which have been reproduced by the reproducing elements confronting said n tracks, respectively, and for independently producing the signals reproduced from each of said n tracks.

2. A digital signal reproducing apparatus as claimed in claim 1 in which said reproducing elements of said reproducing element means are constituted by magneto-resist elements which are arranged equidistant from each other along the tape width direction.

3. A digital signal reproducing apparatus as claimed in claim 1 which further comprises timing signal generating means for supplying clock signals, a reference signal and a transfer signal to said parallel-to-serial converter means and for supplying one of the clock signals to said controller means, and said parallel-to-serial converter means produces said serial reproduced signal after producing the reference signal supplied from said timing signal generating means.

4. A digital signal reproducing apparatus as claimed in claim 1 in which said controller means comprises a comparator for detecting the signal reproduced from the first track, a first monostable multivibrator for delaying an output detection signal of said comparator and for producing a first pulse which is in correspondence with the first track during the time period in which the outputs of those reproducing elements confronting the part of the first track where the magnetic field intensity distribution is substantially uniform are obtained, a second monostable multivibrator responsive to said first pulse for producing a second pulse having a period corresponding to the interval of said n tracks, a third monostable multivibrator responsive to said first and second pulses for producing a third pulse having a pulse width corresponding to a part of each part of said n tracks where a magnetic field intensity distribution is substantially uniform, and a demultiplexer responsive to said third pulse for time-sequentially producing a plurality of fourth pulses which are in correspondence with each of said n tracks.

5. A digital signal reproducing apparatus as claimed in claim 4 in which said controller means further comprises a first counter for measuring a time from a detection of said reference signal to a detection of the signal reproduced from said first track, a second counter for producing a fifth pulse corresponding to said first pulse based on the time measured in said first counter, and a switch for selectively producing said fifth pulse instead of said first pulse when a signal reproduced from said first track cannot be detected.

6. A digital signal reproducing apparatus as claimed in claim 5 in which said controller means further comprises a circuit for detecting the signal reproduced from said first track only within a predetermined time from a detection of said reference signal.

* * * * *